United States Patent
Wu et al.

(10) Patent No.: US 10,246,860 B1
(45) Date of Patent: Apr. 2, 2019

(54) SHOWER CLAMP STRUCTURE

(71) Applicants: Chin-Lung Wu, Taichung (TW);
Wei-Sheng Wu, New Taipei (TW)

(72) Inventors: Chin-Lung Wu, Taichung (TW);
Wei-Sheng Wu, New Taipei (TW)

( * ) Notice: Subject to any disclaimer, the term of this patent is extended or adjusted under 35 U.S.C. 154(b) by 0 days.

(21) Appl. No.: 15/939,205

(22) Filed: Mar. 28, 2018

(51) Int. Cl.
*A47K 3/00* (2006.01)
*E03C 1/06* (2006.01)
*A47K 3/28* (2006.01)
*F16B 2/12* (2006.01)
*E03C 1/04* (2006.01)
*B05B 1/18* (2006.01)

(52) U.S. Cl.
CPC ............... *E03C 1/06* (2013.01); *A47K 3/281* (2013.01); *F16B 2/12* (2013.01); *B05B 1/185* (2013.01); *E03C 1/0409* (2013.01)

(58) Field of Classification Search
CPC .......... E03C 1/06; E03C 1/0408; E03C 1/066; B05B 15/62
USPC ............ 248/313, 316.3, 316.4, 316.6, 316.8, 248/220.21, 220.22, 75; 4/596, 600; 239/436, 437
See application file for complete search history.

(56) References Cited

U.S. PATENT DOCUMENTS

| | | | | |
|---|---|---|---|---|
| 2,900,139 A | * | 8/1959 | Hensley, Jr. ............ | B05B 1/267 239/499 |
| 3,465,968 A | * | 9/1969 | Halpern .................. | B05B 1/262 239/504 |
| 9,216,425 B2 | * | 12/2015 | Ojea ......................... | B05B 1/18 |
| 9,382,699 B2 | * | 7/2016 | Andersen ................ | E03C 1/066 |
| 2009/0321599 A1 | * | 12/2009 | Huang ...................... | E03C 1/06 248/230.3 |

* cited by examiner

*Primary Examiner* — Steven M Marsh
(74) *Attorney, Agent, or Firm* — Pro-Techtor International Services; Ian Oglesby

(57) ABSTRACT

A shower clamp structure includes a gear with a pillar, a spiral spring, two clamping members, a cover, and a screw locking member. The adaptor has a recession formed at an end of the adaptor for receiving the spiral spring, and an end of the spiral spring is positioned in the recession, and a protrusion of the gear is disposed in the spiral spring, and the external periphery of the protrusion is provided for positioning a free end of the spiral spring, and the two clamping members have a protective plate each, and both opposite sides of two protective plates have a plate each and each plate has a rack facing the gear, and each rack is engaged with the gear, and the cover has a guide slot facing the adaptor and provided for receiving the plates of the two clamping members. The screw locking member is passed through the cover, gear, and spiral spring and screwed into the adaptor. The structure not just has very few components to facilitate users to assemble the structure only, but also improve the overall aesthetic decoration of the shower space.

3 Claims, 6 Drawing Sheets

SHOWER CLAMP STRUCTURE

FIELD OF THE INVENTION

The present disclosure relates to a shower clamp structure, in particular to a shower clamp provided for clamping a shower head.

BACKGROUND OF THE INVENTION

In general, a conventional shower head is provided for users to hold by a hand to achieve the effect of taking a shower. The users have to spare a hand to hold the shower head, while using the other hand to wash their body. Obviously, such application is inconvenient. Therefore, the shower head is usually equipped with a shower holder fixed onto a wall and provided for holding or hanging the shower head, so that the users can wash their body by both hands.

As disclosed in R.O.C. Pat. No. M289781 entitled "A rotary positioning shower head hanger", the hanger comprises a holder, a movable seat, an elastic positioning member and a screw, wherein the holder is fixed onto a wall, and a cooperating seat is disposed at the front of the holder, and a locking body is installed on an inner side of the cooperating seat, and a plugging slot is formed at the front of the movable seat and provided for plugging and fixing a shower head, so that the shower head can be plugged and the plugging angle of the shower head can be adjusted conveniently.

Although the conventional structure can achieve the effect of plugging the shower head for use, the structure includes many components which are inconvenient for users to assemble the shower head structure. In addition, a standard conventional hanger design also affects the overall aesthetic appearance of the shower space. Obviously, the conventional shower head structure requires improvements.

SUMMARY OF THE INVENTION

Therefore, it is a primary objective of the present invention to overcome the aforementioned drawbacks by providing a shower clamp structure with very few components to facilitate users to assemble the shower clamp structure and improve the aesthetic appearance of the shower space.

To achieve the aforementioned and other objectives, the present invention provides a shower head clamping device comprising a water intake hose, an adaptor, a connecting hose and a shower head with a handle, wherein the adaptor is installed at an end of the water intake hose, and a water outlet is formed at a predetermined position of the external periphery of the adaptor and provided for installing an end of the connecting hose, and an free end of the connecting hose is coupled to the handle of the shower head, characterized in that the adaptor has a clamping structure disposed at an end without the water intake hose for clamping the shower head, and the clamping structure comprises a spiral spring, a gear with a pillar, two clamping members, a cover, and a screw locking member; the adaptor has a recession formed at an end of the adaptor for receiving the spiral spring, and an end of the spiral spring is fixed in the recession, and the protrusion of the gear is installed in the spiral spring, the external periphery of the protrusion is provided for positioning a free end of the spiral spring, and the two clamping members have a protective plate each, and both opposite sides of the two protective plates have a plate each, and each plate has a rack disposed on a side facing the gear, and each rack is engaged with the gear, and the cover has a guide slot formed on a side of the cover and facing the adaptor and provided for receiving the plates of the two clamping members, and the screw locking member is passed through the cover, the gear, and the spiral spring and screwed into the adaptor.

Wherein, the recession of the adaptor has a latch slot for positioning an end of the spiral spring, and the protrusion of the gear has a latch slot formed at a predetermined position of the external periphery of the protrusion for positioning the free end of the spiral spring.

Wherein, the screw locking member is a screw.

DESCRIPTION OF THE PREFERRED EMBODIMENTS

Figure 1:
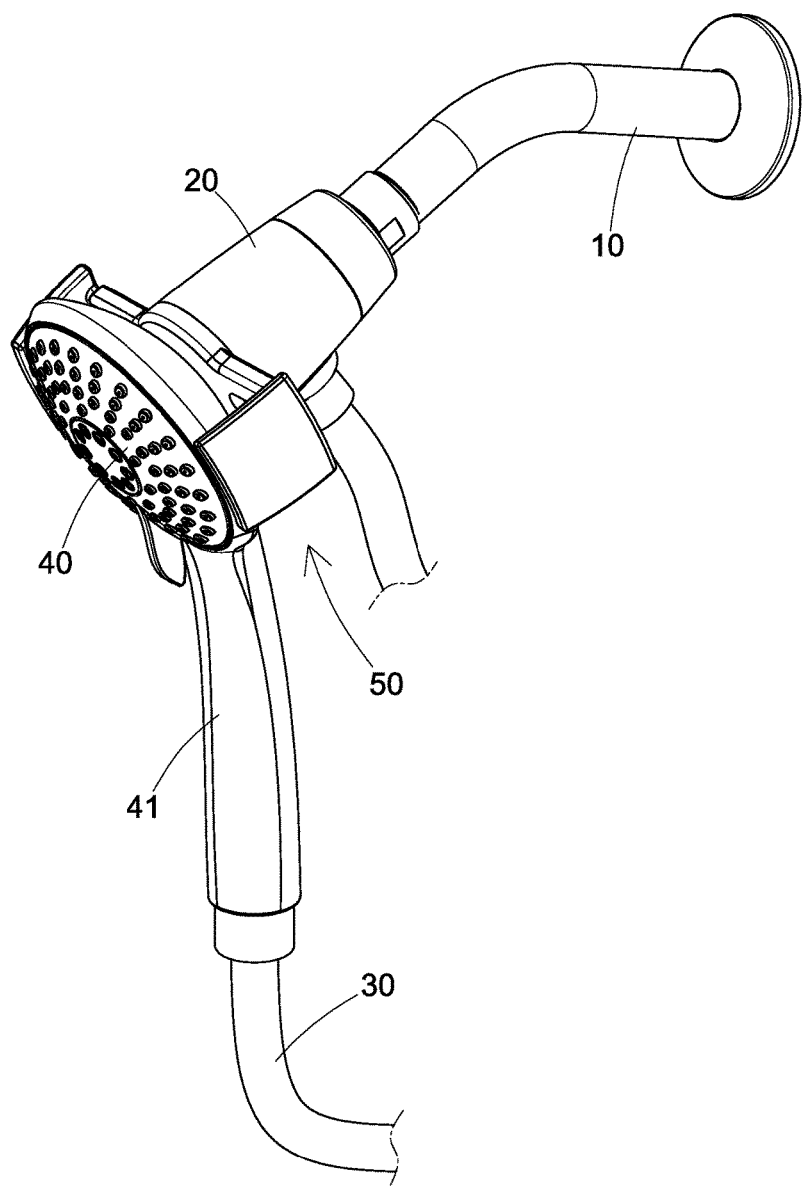
FIG. 1 is a perspective view of a shower clamp structure in accordance with an embodiment of this disclosure.
Figure 2:
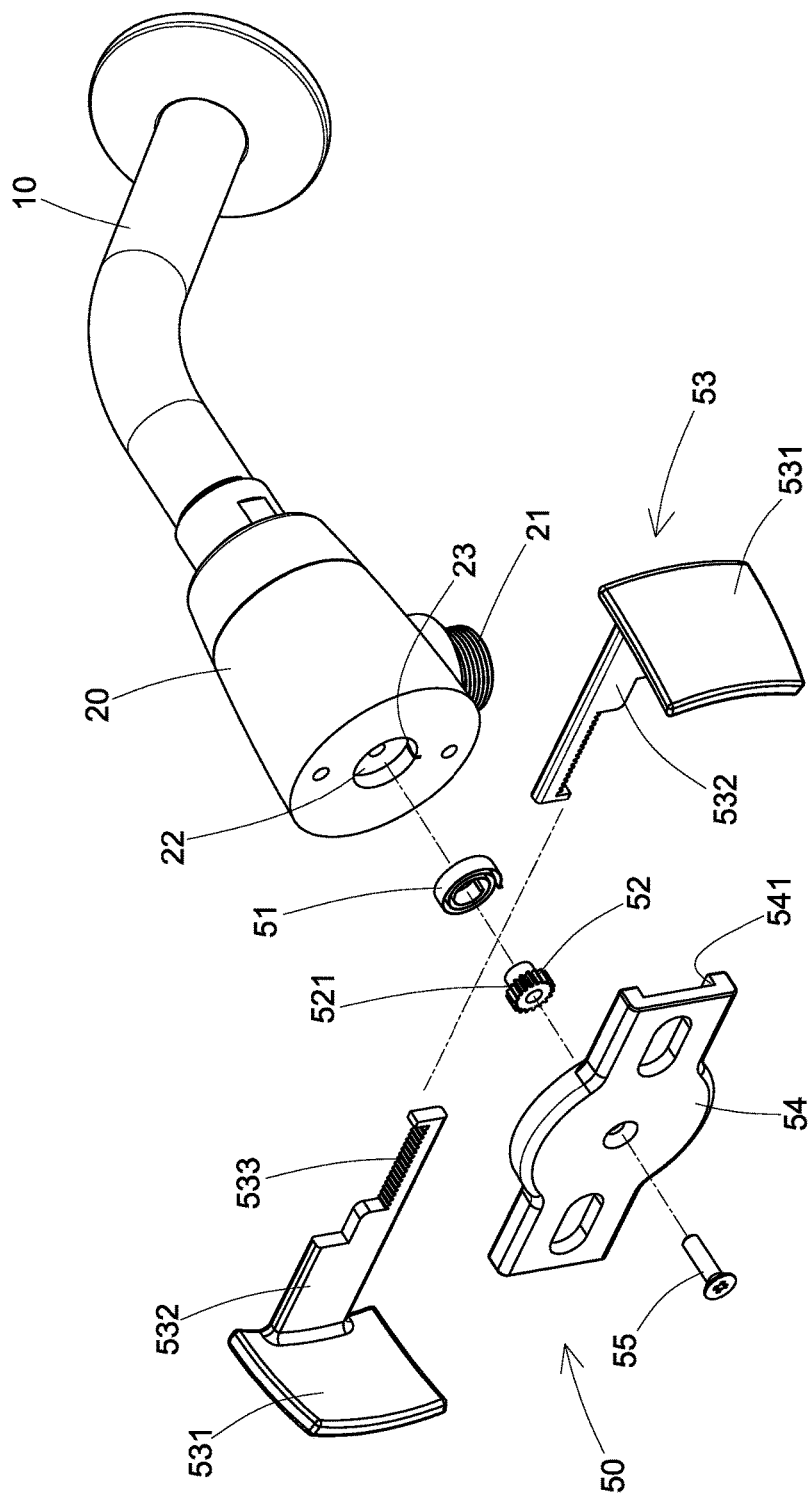
FIG. 2 is an exploded view of this disclosure.
Figure 3:
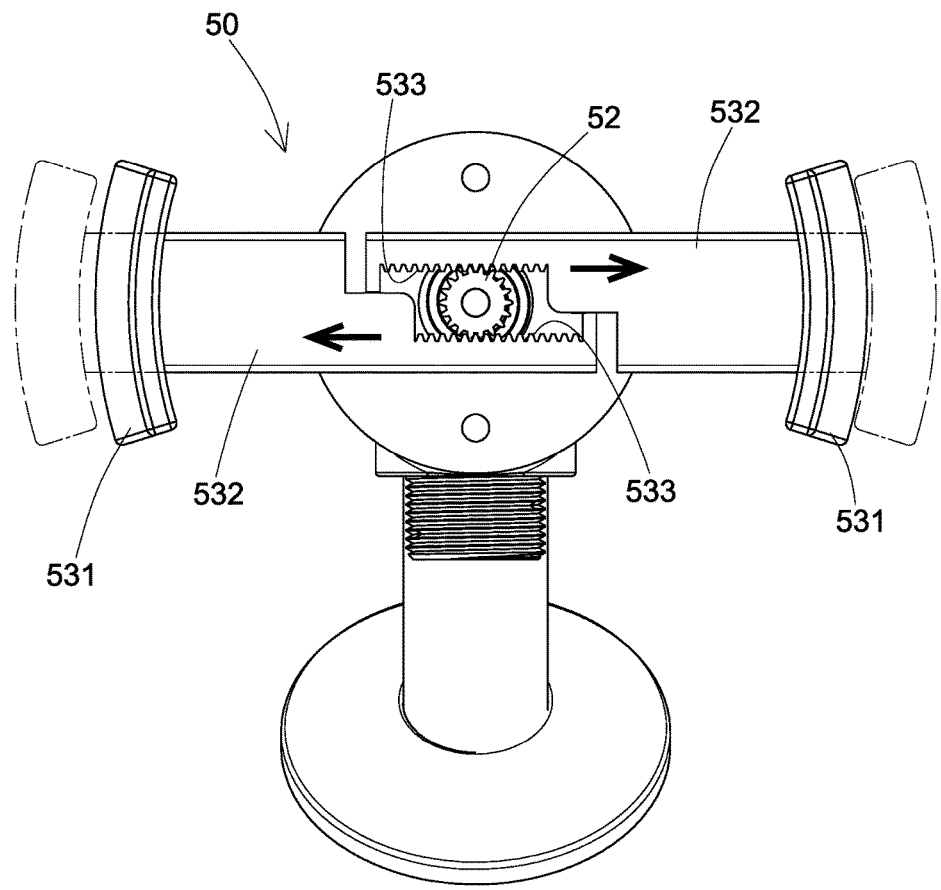
FIG. 3 is a schematic view of outwardly opening a shower clamp structure of this disclosure.
Figure 4:
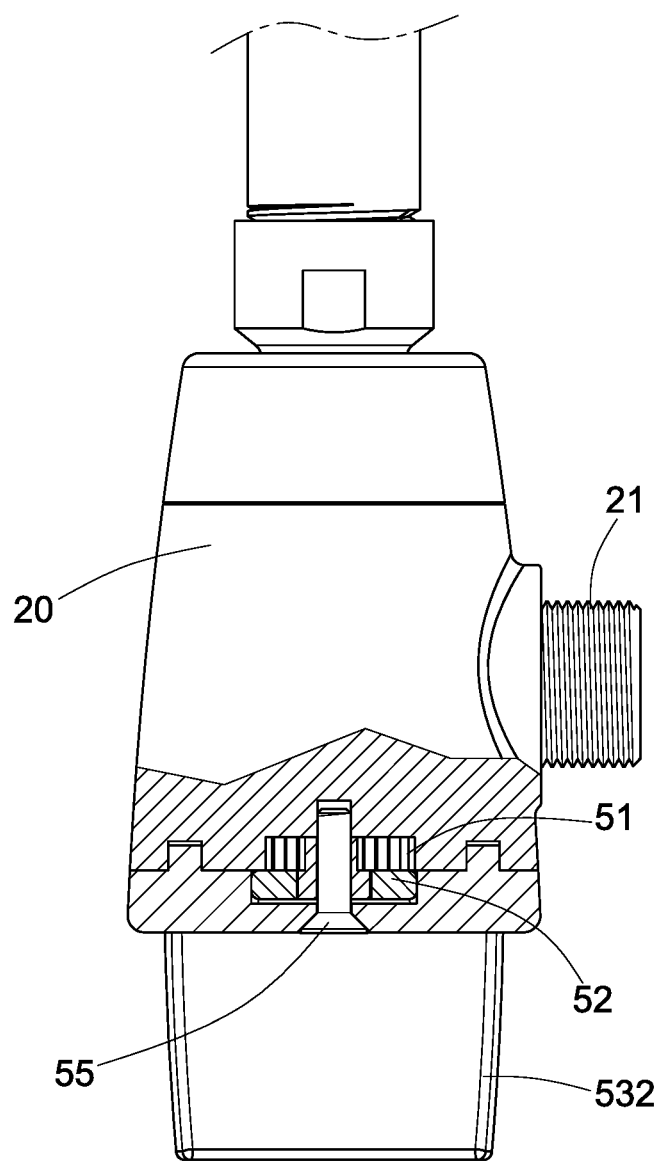
FIG. 4 is a partial cross-sectional view of this disclosure.
Figure 5:
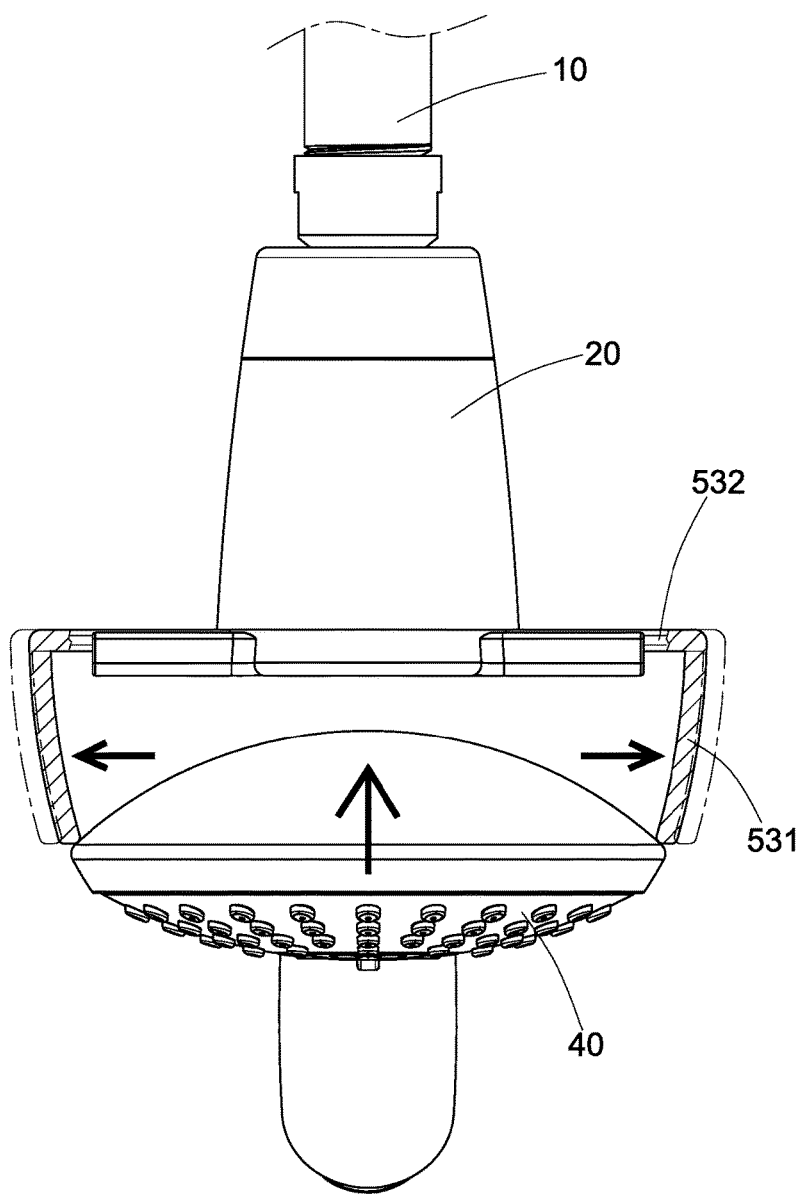
FIG. 5 is a schematic view of operating a shower clamp structure in accordance with an embodiment of this disclosure.

With reference to FIGS. 1 to 6 for a shower clamp structure of this disclosure, the shower clamp structure comprises a water intake hose 10, an adaptor 20, a connecting hose 30 and a shower head 40 with a handle 41.

The adaptor 20 is installed at an end of the water intake hose 10, and a water outlet 21 is formed at a predetermined position of the external periphery of the adaptor 20 and provided for installing an end of the connecting hose 30, and a free end of the connecting hose 30 is coupled to the handle 41 of the shower head 40.

It is noteworthy that the adaptor 20 has a clamping structure 50 disposed at an end without the water intake hose 10 for clamping the shower head 40, and the clamping structure 50 comprises a spiral spring 51, a gear 52 with a pillar 521, two clamping members 53, a cover 54, and a screw locking member 55.

The adaptor 20 has a recession 22 formed at an end of the adaptor 20 for receiving the spiral spring 51, and the recession 22 has a latch slot 23 formed at an end of the recession 22 for positioning the spiral spring 51, and the protrusion 521 of the gear 52 is installed in the spiral spring 51, and the protrusion 521 has a latch slot (not shown in the figure) formed at a predetermined position of the external periphery for positioning a free end of the spiral spring 51, and the two clamping members 53 have a protective plate 531 each, and both opposite sides of the two protective plates 531 have a plate 532 each, and each plate 532 has a rack 533 on a side facing the gear 52, and each rack 533 is engaged with the gear 52, and the cover 54 has a guide slot 541 formed on a side facing the adaptor 20 and provided for receiving the plates 532 of the two clamping members 53, and the screw locking member 55 is passed through the cover 54, the gear 52, and the spiral spring 51, and screwed into the adaptor 20.

Wherein, the screw locking member 55 is a screw.

Figure 6:
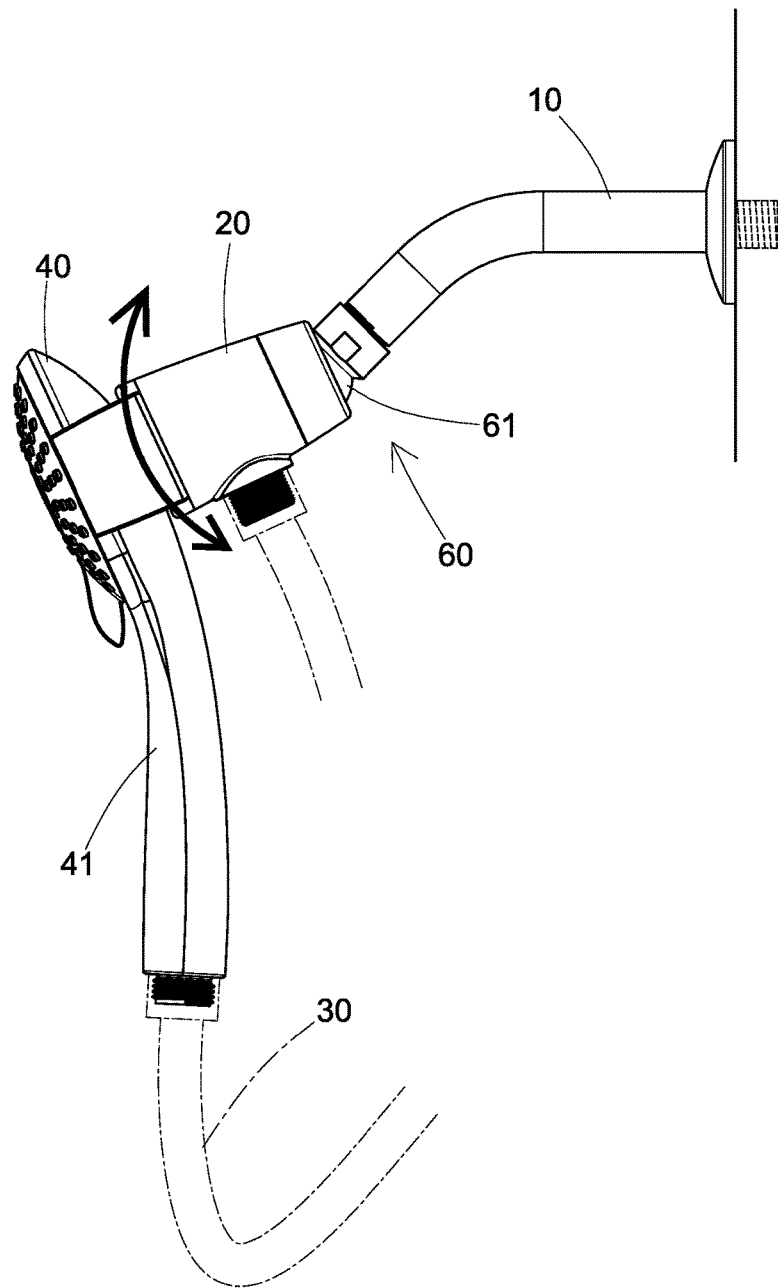
FIG. 6 is a schematic view of adjusting the angle of a shower clamp structure in accordance with an embodiment of this disclosure.

The shower head clamping device further comprises a universal joint 60 installed between the water intake hose 10 and the adaptor 20, and the universal joint 50 is formed by a ball head 61 and a ball socket (not shown in the figure), and the ball head 61 is installed at a distal portion of the water intake hose 10, and the ball socket is formed at an end of the adaptor 20 for receiving the ball head 61 (as shown in FIG. 6).

In FIGS. 1 to 6, the shower clamp structure of this disclosure has very few components to facilitate users to assemble the structure. When a user wants to take a shower, the user simply needs to turn on the switch to supply water to the water intake hose 10, so that the water flows from the water outlet 21 of the adaptor 20 into the connecting hose 30, and the water is outputted from the shower head 40 to achieve the shower effect. The whole operation is simple, easy and convenient.

It is noteworthy that the adaptor 20 of this embodiment has a clamping structure 50 installed at an end of the water intake hose 10 for clamping the shower head 40, so that after a user completes using the shower head 40, the user may push the shower head 40 into a position between the two protective plates 531 of the two clamping members 53. Since the shower head 40 has an external diameter greater than the gap between the two protective plates 531, therefore the two protective plates 531 are spread open to move the two clamping members 53 towards the outer sides respectively, and the two racks 533 drive the gear 52 to rotate and drive the spiral spring 51 to be rotated and rewound. The elasticity of the spiral spring 51 is provided to ensure the two protective plates 531 to be clamped tightly towards the inner sides all the time to achieve the effect of clamping the shower head 40 tightly. The whole structure has very few components to facilitate users to assemble the structure and improve the aesthetic appearance of the shower space.

In FIG. 6, the shower clamp structure of this disclosure further comprises a universal joint 60, wherein a ball head 61 is installed at a distal portion of the water intake hose 10, and a ball socket is formed at an end of the adaptor 20 for receiving the ball head 61, so that users may adjust the angle of the adaptor 20 in order to set the angle of the shower head 40 to a different angle. The operation is simple, easy, and convenient.

What is claimed is:

1. A shower clamp structure, comprising a water intake hose, an adaptor, a connecting hose and a shower head with a handle, and the adaptor being installed at an end of the water intake hose, and a water outlet formed at a predetermined position of an external periphery of the adaptor and provided for installing an end of the connecting hose, and an free end of the connecting hose being coupled to the handle of the shower head, characterized in that the adaptor has a clamping structure disposed at an end without the water intake hose for clamping the shower head, and the clamping structure comprises a spiral spring, a gear with a pillar, two clamping members, a cover, and a screw locking member; the adaptor has a recession formed at an end of the adaptor for receiving the spiral spring, and an end of the spiral spring is fixed in the recession, and the protrusion of the gear is installed in the spiral spring, and the external periphery of the protrusion is provided for positioning the free end of the spiral spring free end, and the two clamping members have a protective plate each, and both opposite sides of the two protective plates have a plate each, and each plate has a rack facing a side of the gear, and each rack is engaged with the gear, and the cover has a guide slot formed on a side of the cover and facing the adaptor and provided for receiving the plates of the two clamping members, and the screw locking member is passed through the cover, the gear, and the spiral spring and screwed into the adaptor.

2. The shower clamp structure of claim 1, wherein the recession of the adaptor has a latch slot for positioning an end of the spiral spring, and the protrusion of the gear has a latch slot formed at a predetermined position of the external periphery of the protrusion for positioning the free end of the spiral spring.

3. The shower clamp structure of claim 1, wherein the screw locking member is a screw.

\* \* \* \* \*